United States Patent

[11] 3,615,569

| [72] | Inventor | Robert Charles Desjarlais<br>South Hadley Falls, Mass. |
|---|---|---|
| [21] | Appl. No. | 880,900 |
| [22] | Filed | Nov. 28, 1969 |
| [45] | Patented | Oct. 26, 1971 |
| [73] | Assignee | The Plastic Coating Corporation<br>South Hadley, Mass. |

[54] IMAGE STABILIZATION IN DIAZOSULFONATE PHOTOREPRODUCTION
6 Claims, No Drawings

[52] U.S. Cl. ..................................................... 96/91, 96/49
[51] Int. Cl. ...................................................... G03c 1/56, G03c 1/60
[50] Field of Search ........................................... 96/49, 75, 91

[56] References Cited
UNITED STATES PATENTS

| 2,854,338 | 9/1958 | Herrick et al. ................. | 96/49 X |
|---|---|---|---|
| 3,479,183 | 11/1969 | Habib et al. .................. | 96/49 |

OTHER REFERENCES

Fieser & Fieser, " Organic Chemistry," 3rd Ed., 1956, p. 224– 228.

*Primary Examiner*—Norman G. Torchin
*Assistant Examiner*—Charles L. Bowers, Jr.
*Attorneys*—Wm. J. Foley, John A. Weygandt, John W. Kane, Jr., S. T. Hadley, A. J. McNulty and M. L. Faigus

ABSTRACT: Inclusion of an amine salt of an aromatic carboxylic acid in a reversal diazosulfonate photosensitive composition prevents dye color-shift and background coloration.

IMAGE STABILIZATION IN DIAZOSULFONATE PHOTOREPRODUCTION

BACKGROUND OF THE INVENTION

1. Field of the Invention

The invention described herein was made under a contract with the United States Air Force. The present invention relates to photosensitive diazosulfonate formulations and to diazo photographic reproduction materials made therefrom.

2. Description of the Prior Art

In U.S. Pat. application, Ser. No. 464,447, now U.S. Pat. No. 3,479,183 issued Nov. 18, 1969, there is disclosed and claimed a negative-working or reversal diazo photographic reproduction (photoreproduction) material made from a formulation comprising a para-amino benzene diazosulfonate, a coupler (i.e., a color former) therefor and a substantially nonvolatile amine. This formulation is applied as a discrete layer upon the surface of a support. The resulting light-sensitive material is useful for photographically reproducing images contained in master transparencies, such as microfilm, engineering drawings, and aerial photographs, through the action of light on the diazo formulation.

The image-producing process described in the aforementioned patent application comprises the steps of image-wise exposing the diazo imaging-material to actinic illumination (blue-violet and ultraviolet light) to convert the diazosulfonate to an active diazonium compound which couples with a coupling component to provide a dye-image in the light-struck areas; acidifying the discrete layer with acid vapor; and light clearing the unreacted diazosulfonate by exposing it overall to actinic illumination, thereby forming colorless decomposition products of the diazosulfonate to produce a stable, fixed, dye-image against a clear background. Formic acid, being highly volatile, is desirable for use in the clearing operation. The formic acid reacts with the substantially nonvolatile amine to form an amine formate, which is a basic salt. So long as the acid remains absorbed, the material is acid. Because of its volatility, however, the formic acid tends to evaporate from the substrate upon aging, even at room temperature. As the formic acid leaves the material, the amine formate renders it increasingly alkaline. Under alkaline conditions, the coupling components can exhibit a color shift, resulting in objectionable background coloration. Alkalinity can also cause a shift in shade in the azo dye-image.

Accordingly, it is an object of the present invention to prevent azo dye color-shift upon aging an image in reversal diazosulfonate photoreproduction material.

Another object of the invention is to provide improved retention of brightness in the background areas of the fixed print as it ages.

SUMMARY OF THE INVENTION

In accordance with the present invention the incorporation of an amine salt of an aromatic carboxylic acid into the above-described diazosulfonate formulation prevents dye color-shift and background coloration.

More particularly, the improvement of the present invention comprises the incorporation into the diazosulfonate formulation of a compound corresponding to the formula:

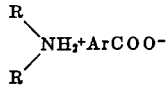

wherein R is an alkyl, amino alkyl, cycloalkyl, or hydroxyalkyl radical and Ar is a benzene, naphthalene, substituted benzene, or substituted naphthalene radical.

While the present inventor does not wish to be bound to any particular theory, he postulates that the amine salt of the aromatic carboxylic acid (amino acid salt) reacts with the formic acid during the clearing step to produce a free carboxylic acid, which is nonvolatile and maintains the medium acid. Since the free carboxylic acid is relatively strong and merely has to offset the basicity of the amine formate, the presence of even a small amount of the amine acid salt of the invention can be effective. Accordingly, no narrow range of concentrations of the amine acid salt can be described as critical, and provided that more than trace amounts are used, satisfactory results are obtained through the use of a wide range of concentrations, the preferred being a concentration equal to twice the molar concentration of the substantially nonvolatile amine. The amine acid salt must be approximately neutral in an aqueous medium so that it does not significantly lower the pH of the photoreproduction material, which must be above pH 5 during the exposure step. If not neutral, the salt should preferably be slightly alkaline and hence compatible with the alkalinity of the medium prior to exposure. The salt cannot be too strongly basic, however, lest the acid used in the clearing step not be strong enough to convert it to free carboxylic acid.

Accordingly, R in the formula given above is selected so that the amine constituent

has a pKa of 10–12.

Preferred are amines according to the formula:

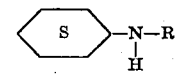

wherein R is an alkyl, aminoalkyl, or hydroxyalkyl radical. By way of example, when R is ethyl, the pKa is 11.3; when R is isopropyl, the pKa is 11.3; when R is 2-hydroxypropyl, the pKa is 10.1; when R is 3-aminopropyl, the pKa is 10.9.

The amine acid salts of the invention are prepared from commercially available reagents by methods well known to those of ordinary skill in the art. Typically, the carboxylic acid is dissolved in ether and an equimolar amount of the amine is added slowly thereto. The amine acid salt precipitates and is recovered by filtration.

DESCRIPTION OF PREFERRED EMBODIMENTS

Example I

A solution comprising:

| Component | Amount |
|---|---|
| "Half-second acetate" (a low-viscosity cellulose diacetate), g | 16 |
| Methanol, cc | 30 |
| Acetone, cc | 70 |
| Polypropylene glycol (average molecular weight 400), cc | 5 |
| Ortho-sulfobenzaldehyde, sodium salt, g | 1.44 |
| 2-hydroxy-3-naphthoic acid-ortho-anisidide (2-hydroxy-3-naphthoic acid, 2-methoxy-anilide), g | 1.16 |
| 1-hydroxy-2-naphthoic acid piperidide, g | 0.533 |
| 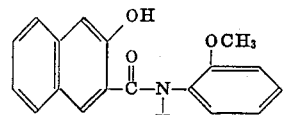 | |
| N-isopropyl, N-cyclohexyl amine, g | 0.69 |
| 4-(N-ethyl, N-benzylamino) benzene diazosulfonate, sodium salt, g | 1.75 |
| N-isopropyl, N-cyclohexyl amine salicylate, g | 1.4 |

This solution was coated, by means of a No. 36 Mayer bar, onto a sheet of polyester which was provided with a suitable bonding layer and dried. The resulting film was then exposed to actinic light under a partially opaque master to give a black image in the unprotected—i.e. light struck—areas. The film was then fixed and the background areas cleared by acidifying at 230° F. with formic acid vapors and reexposing the entire film to actinic light. On aging, this print remained a neutral black shade. By comparison, a control print, without the N-isopropyl,N-cyclohexyl amine exhibited a blue-plum coloration in the image areas, and a yellow discoloration in the background areas.

Examples II–IX

The following amine acid slats, in the amounts given were, successively substituted for the N-isopropyl,N-cyclohexylamine salicylate in the formulation of example I.

| N-isopropyl,N-cyclohexyl amine salt | Amount in grams |
| --- | --- |
| meta-chloro benzoate | 1.49 |
| acetyl salicylate | 1.61 |
| 5-chloro salicylate | 1.62 |
| alpha-naphthoate | 1.57 |
| beta naphthoate | 1.57 |
| phthalate | 2.08 |
| beta resorcylate | 1.48 |
| 1-hydroxy-2-naphthoate | 1.65 |

Example X

A solution comprising:

| Component | Amount |
| --- | --- |
| "half-second acetate" | 16 g. |
| methanol | 30 cc. |
| acetone | 70 cc. |
| polypropylene glycol (average molecular weight 400) | 3 cc. |
| ortho-sulfobenzaldehyde, sodium salt | 1.44 g. |
| 2-hydroxy-3-naphthoyl-o-anisidide | 1.29 g. |
| 1-hydroxy-2-naphthoyl piperidide | 0.441 g. |
| N-isopropyl,N-cyclohexyl amine | 1.28 g. |
| 4-(N-ethyl, N-benzylamino)-benzene diazosulfonate sodium salt | 1.75 g. |
| N-isopropyl,N-cyclohexylamine salt of 1-hydroxy,2-naphthoic acid | 1.64 g. |

This solution was coated, by means of a No. 36 Mayer bar, onto a sheet of ethyl cellulose-treated, baryta-sized paper and dried. The paper was then exposed to actinic light under a partially opaque master to give a black image in the unprotected—i.e., light struck—areas. The print was then fixed and the background areas cleared by acidifying with formic acid vapors and reexposing the entire sheet to actinic light. This print retained a neutral black shade upon aging, and a colorless background.

While the invention has been described with reference to preferred embodiments thereof, it is understood that various other changes and modifications thereof will occur to a person of ordinary skill in the art without departing from the spirit and scope of the invention, as defined by the appended claims.

What is claimed is:

1. In a photosensitive diazo coating formulation comprising a para-amino benzene diazosulfonate, an azo coupling component, and a substantially nonvolatile amine, the improvement which comprises the inclusion of a salt of an aromatic carboxylic acid and an organic amine in said formulation, said salt corresponding to the formula

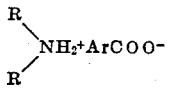

wherein R is an alkyl, aminoalkyl, cycloalkyl or hydroxyalkyl radical and Ar is a benzene, naphthalene, substituted benzene or substituted naphthalene radical.

2. The formulation according to claim 1 wherein, in the compound corresponding to the formula given, one R group is cyclohexyl.

3. the formulation according to claim 2 wherein, in the compound corresponding to the formula given, the other R group is isopropyl.

4. A reversal diazo photoreproduction material which comprises a support and a photosensitive layer coated on a surface of the support, said layer comprising the formulation according to claim 1.

5. The material according to claim 4 wherein, the compound corresponding to the formula given, an R group is cyclohexyl.

6. The material according to claim 5 wherein, in the compound corresponding to the formula given, the other R group is isopropyl.